United States Patent [19]
Peterson

[11] Patent Number: 5,997,101
[45] Date of Patent: Dec. 7, 1999

[54] SURFACE-ASSISTED CONTINUOUS UNDERGROUND MINE CONVEYOR

[76] Inventor: Randall D. Peterson, 11602 Colchester Dr., Sandy, Utah 84092

[21] Appl. No.: 09/024,438

[22] Filed: Feb. 17, 1998

[51] Int. Cl.[6] .............................. E21D 9/12; B65G 41/02
[52] U.S. Cl. ............................... 299/64; 299/18; 198/303
[58] Field of Search .................................. 299/18, 64, 67; 198/303, 465.4, 588, 687, 687.1

[56] References Cited

U.S. PATENT DOCUMENTS

| 2,826,402 | 3/1958 | Alspaugh et al. | 299/1.4 |
| 4,339,031 | 7/1982 | Densmore | 198/861.2 |
| 4,784,257 | 11/1988 | Doerr | 198/594 |
| 4,896,764 | 1/1990 | Neunzert | 198/812 |

*Primary Examiner*—David Bagnell
*Assistant Examiner*—John Kreck
*Attorney, Agent, or Firm*—Antonio R. Durando

[57] ABSTRACT

A system for providing utilities and support infrastructure on a continuous basis from the surface to the cutting face of an underground operation. A flexible belt structure system incorporates water supply and discharge lines, power and communication cables, hydraulic supply and return lines, bulk lubrication delivery systems, and belt support structure for underground coal haulage. The system consists of modular components that are added at the surface and connected underground to form a continuous support structure to the working area, such that the infrastructure necessary for the mining operation is expanded or reduced to keep up with the position of the mining face without interruption of operation. The belt structure is mounted on a stationary rail fixed to the roof of the mine and is rolled forward or backwards in the belt entry as the mine advances or retreats, as applicable.

22 Claims, 9 Drawing Sheets

SURFACE-ASSISTED CONTINUOUS UNDERGROUND MINE CONVEYOR

BACKGROUND OF THE INVENTION

1. Field of the Invention

This invention pertains in general to the field of underground mining and, in particular, to a novel adaptation of continuous-miner development and retreat mining techniques for shortwall and longwall to recover underground reserves under shallow cover.

2. Description of the Related Art

Continuous underground mining is used to extract fossil fuels and other valuable minerals found in strata-bound deposits. Historically, underground mining is carried out by gaining access to the ore through entries developed from an exposed seam. This development is generally done from the point of interest at the surface, such as at an outcrop or from an exposed highwall resulting from surface mining. All mining utilities, ventilation, transportation of personnel, and removal of the mined material are carried in and out by utilizing such entries within the mineral seam. As a result, it has been conventional practice not to exploit with underground methods deposits having shallow cover with no highwalls or outcrop, or ones with reclaimed highwalls having spoils placed against them, or with highwalls or an outcrop left unsuitable for entry because of previous mining. It has been found that gaining underground entry to the seam through such unfavorable conditions would render the practice uneconomical under most circumstances. On the other hand, gaining entry to the seam through a vertical or inclined shaft results in significant cost increases that often also render the operation uneconomical. The expense of lowering belt and structure components, as well as electrical, hydraulic and pneumatic system parts, through the shaft and assembling them underground would be prohibitive. Therefore, there is a need for an efficient, economic and safe method of recovery of underground coal reserves under such conditions.

This invention is directed at providing an affordable approach to the exploitation of such shallow reserves by combining efficient seam-mining practices, such as the use of continuous miners, shortwall and longwall, with access to the reserve by means of a vertical shaft equipped with a novel continuous system for feeding infrastructure to the mining face. Thus, the invention materially enhances the feasibility of mining shallow reserves with no direct access to the seam.

The invention is described in the context of coal mining, but its principles are equivalently applicable to any material suitable for extraction with continuous mining equipment, such as lignite, oil shale, limestone, anthracite, trona, potash, halite, bauxite, gypsum, and other sedimentary rocks that host oxide, sulfide or carbonaceous gold ores and/or other poly-metallic minerals. Similarly, the invention is described in terms of a mine developed through a shaft, but it is equivalently applicable to mines where access to the reserves is obtained through entries within the ore seam.

BRIEF SUMMARY OF THE INVENTION

The primary goal of this invention is a method of mining underground coal that does not require the conventional in-seam support infrastructure of underground operations.

Another important objective is a system of support infrastructure that can be at least partially assembled on the surface and fed continuously underground, thereby minimizing the piecemeal progress and corresponding shut-downs that are typical of underground mining.

Another objective is a method of providing mine support infrastructure from the surface that encompasses all utility systems necessary to a continuous mining operation, including belt and belt structure, hydraulic lines, pneumatic hoses, electric cables and communication cables.

Another goal is a method of providing infrastructure that is compatible for use with continuous underground-mining equipment, such as continuous miners, shortwall and longwall.

Yet another objective is a method of mining that is particularly suitable for the economic recovery of coal reserves left under shallow cover behind an inaccessible highwall or outcrop.

Finally, an objective of the invention is a mining technique that is compatible with and suitable for direct implementation with prior-art mining methods and equipment.

Therefore, according to these and other objectives, the present invention consists of sinking a vertical shaft to reach a coal reserve through a shallow cover and using the shaft for providing utilities and support infrastructure virtually on a continuous basis directly from the surface to the mining face of the underground operation. A flexible belt structure system incorporates water supply and discharge lines, power and communication cables, hydraulic supply and return lines, bulk lubrication delivery systems, and belt support structure for underground coal haulage. The system consists of modular components that are added at the surface and connected underground to form a continuous support structure to the working area, such that the infrastructure necessary for the mining operation is expanded or reduced to keep up with the position of the mining face without interruption of operation. The belt structure is mounted on stationary rail or cable fixed to the roof of the mine and is rolled forward or backwards in the belt entry as the mine advances or retreats, as applicable.

According to one aspect of the invention, the flexible structure system is fed through the mine shaft and is attached to a monorail or a cable guide hung horizontally in the seam entry to the face. The rail is bolted to the roof as part of the normal roof control plan as the mining face advances, thereby extending the reach of the belt and allowing it to keep up with the advance of the continuous miner. On retreat, unused rail segments can be removed or, preferably, left attached to the roof bolts behind the retreating face. The belt structure is mounted on rollers hung from the rail, so that the belt's tail loading end or "tail piece," which is part of a mobile boot end, remains with the continuous miner tail or the discharge of the stage loader conveyor from a longwall as it moves in advance or retreat. Each module of the structure is articulated to permit bending as necessary to reach the mining face.

According to another aspect of the invention, the belting is routed to a belt drive on the surface of the mine through a vertical shaft. This shaft is used to provide a gravity belt storage unit that affords exceptional storage capacity. The belt is laced around the conveyor drive unit at the top of the shaft. This permits the slack side of the belt to be looped and weighted along the length of the shaft, providing a large vertical gravity storage unit that eliminates the need for the more limited horizontal belt storage units used in traditional underground mining operations. As a result of this method of belt storage and its capacity, the belt can be advanced continuously for distances heretofore unattainable before a shut-down is required for splicing. Because the belt storage unit hangs vertically in the shaft, the belt is appropriately and simply counter-weighted for proper tension.

Another aspect of the invention relates to the placement of the belt drive on the surface. This location permits direct access to the belting on the surface for splicing additions and removals. Surface splicing is facilitated with surface handling equipment and does not require underground transport of large rolls of belting. Belt addition and removal are made during shut-down periods scheduled for such purposes, which are shorter than they would be underground.

The placement of the belt drive on the surface also affords environmental advantages. Since the belt on the surface is away from the transfer point of coal or ore, the amount of dust in the atmosphere and accumulated on the ground in the immediate area is less than it would be underground. In the case of coal, the resulting fresh atmosphere at the surface makes it possible to use motors without the safe rating required for underground applications. In addition, the cleaner air environment makes it possible to utilize more reliable vulcanized-rubber splices rather than the more common mechanical splices that are required in typically dirty underground environments.

According to still another aspect of the invention, pipes, cables and hoses that are normally attached to the roof or to the belt structure underground and are advanced by shutting each system down and adding lengths of hardware, are instead fed to the mine continuously from the surface where each system is stored in large quantity in a separate unit capable of continuous delivery. Each pipe, cable and hose is laced through each modular segment of the flexible belt structure in continuous fashion from the surface. These systems are advanced or retreated, as applicable, with the rest of the structure, so that all utilities are available all the way to the mining face without interruption during advance and retreat phases of mining.

Each module is completely incorporated into the infrastructure system near the transfer point of the underground belt from the face. The modules, which include top and bottom belt rollers, are added to the system as the mining face advances (or removed as it retreats, as applicable). As each module becomes aligned with the centerline of the belt conveyor already in place, it is installed such that its rollers engage the moving belts in the system and the module becomes integrated with the belt support structure already in place.

Various other purposes and advantages of the invention will become clear from its description in the specification that follows. Therefore, to the accomplishment of the objectives described above, this invention consists of the features hereinafter illustrated in the drawings and fully described in the detailed description of the preferred embodiment and particularly pointed out in the claims. However, such drawings and description disclose but some of the various ways in which the invention may be practiced.

DESCRIPTION OF THE PREFERRED
EMBODIMENTS OF THE INVENTION

The heart of this invention lies in the development of a modular belt structure and the idea of combining all utility delivery systems for an underground mine in a single movable infrastructure system capable of being integrated with the advance and retreat of continuous mining equipment. For the purposes of this invention, continuous mining equipment is defined to encompass not only conventional continuous miners, but also longwall and shortwall cutting machines and any other equipment capable of continuous production in conjunction with a conveyor belt reaching the vicinity of the cutting face. A vertical shaft and conventional seam-entry development for coal access and removal by continuous miner are used for illustration, but the concepts of the invention are applicable to any type of in-seam continuous mining.

Figure 1:
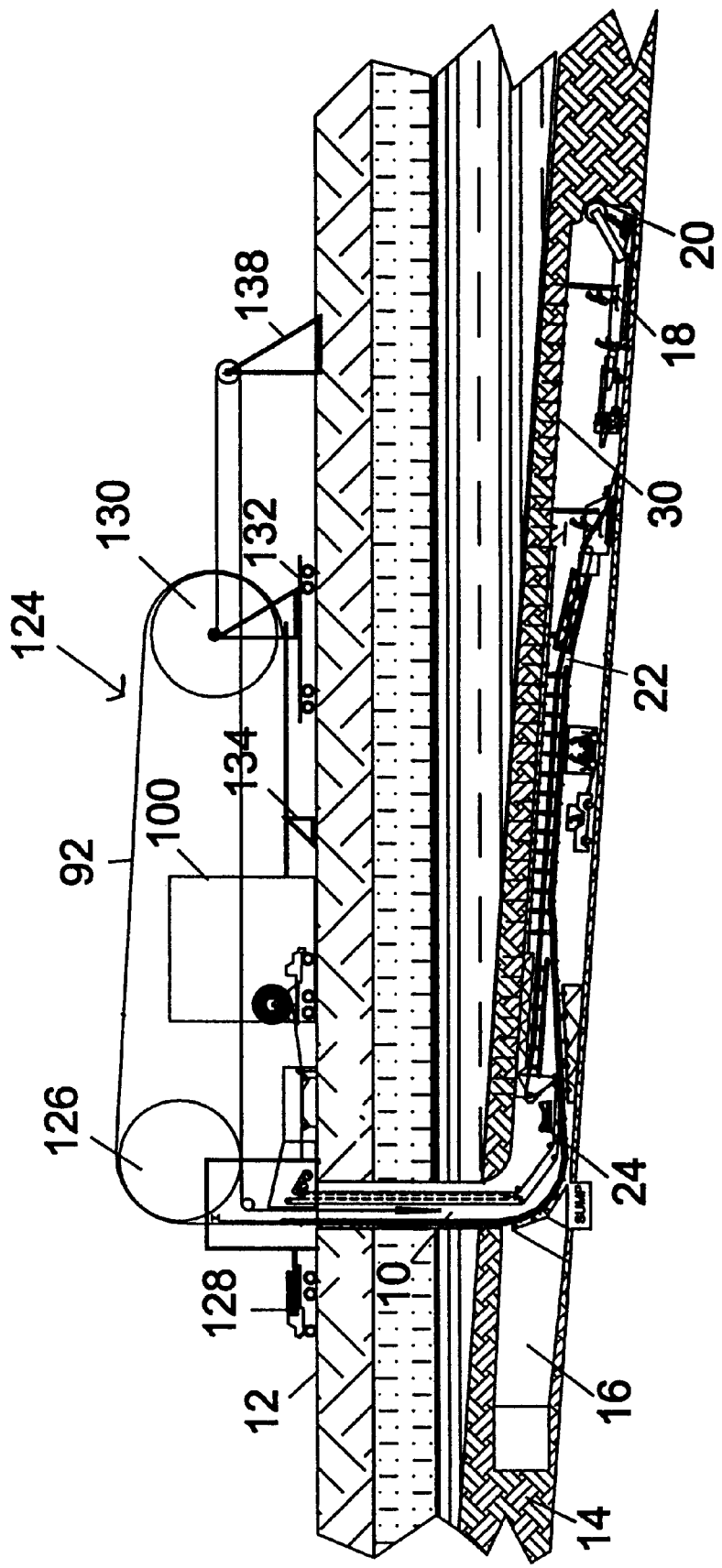
FIG. 1 is a schematic cross-section of an underground coal mine wherein the seam is accessed through a vertical shaft according to the present invention and then developed by traditional continuous mining techniques.
Figure 1A:
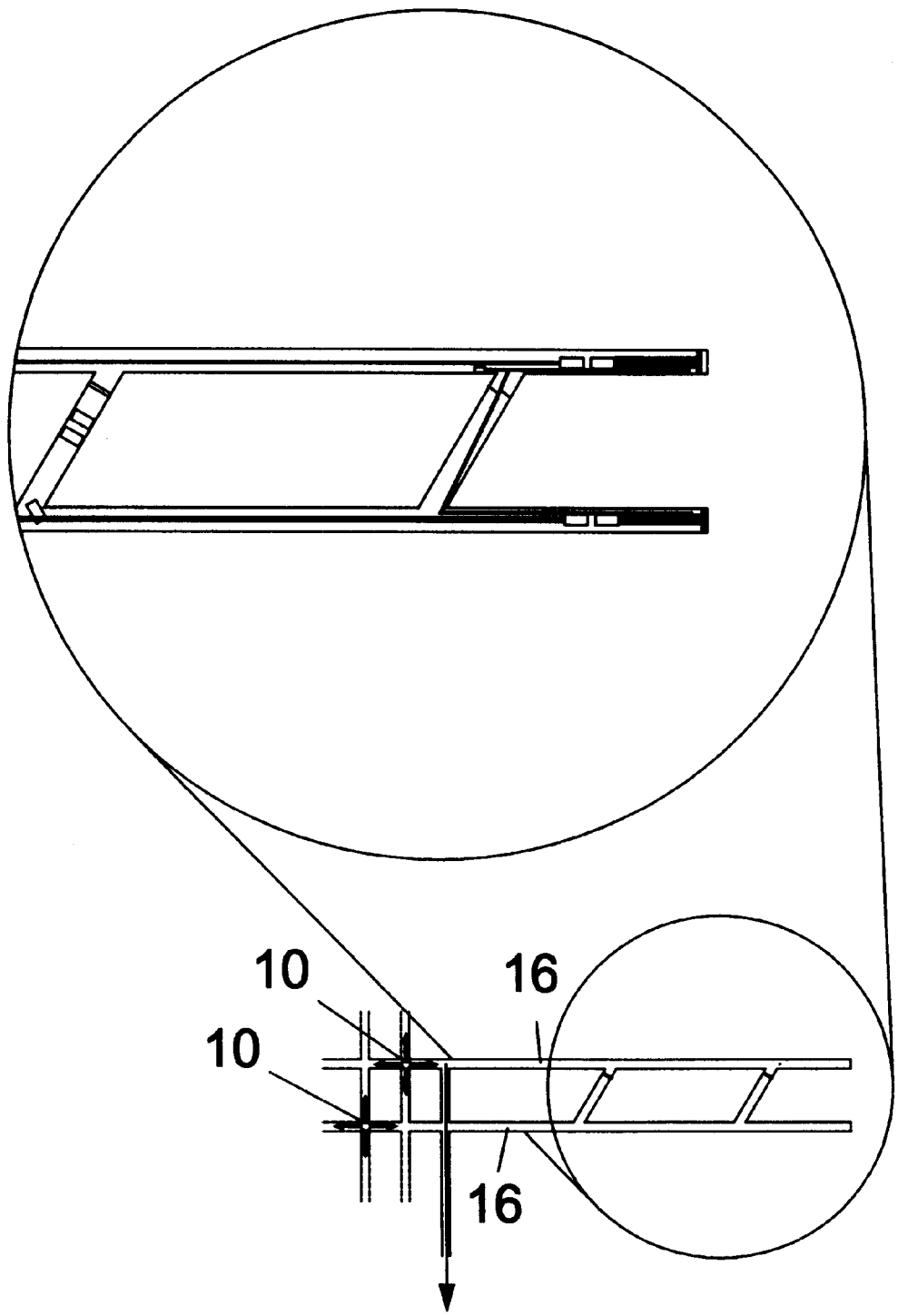
FIG. 1A is a schematic top view of an underground coal mine plan suitable for the invention, showing the location of the entries and cross-cuts of a 2-entry development system with continuous miners in each entry.

As illustrated schematically in the cross-sectional view of a mine of FIG. 1, the preferred implementation of the system of the invention is achieved by sinking a vertical shaft 10 from the surface 12 to the coal seam 14, where an underground mine entry 16 is developed with conventional mining equipment. An appropriate longwall-panel development and ventilation plan consistent with the invention is illustrated in FIG. 1A, but is not discussed in detail here because it would be apparent to one skilled in the art. As a continuous miner 18 cuts the mining face 20 and advances the entry 16 underground, a continuous belt 22 is provided to move the coal production to the surface. As in conventional conveyor systems, the underground belt 22 links the mining face 20 to a transfer point where another belt 24 is loaded to move the coal toward the surface via an auxiliary belt entry (not shown in the drawings).

The underground belt line 22 is supported by the modular infrastructure system of the invention. As better seen in the enlarged views of FIGS. 2 and 3, each module 26 of the belt structure is hung on one or more rollers riding on a rail or cable 28 attached to the roof 30 of the entry 16. Rail is preferred to cable because it does not require tensioning to support the belt structure, but the two are functionally the same for the purposes of the invention. As further detailed below, each belt structure module includes a top bracket with a block and pulley wheel engaging the rail. Each segment of rail is suspended to the roof 30 by means of a bracket attached to roof bolts 32 during normal roof support work. As roof bolts are driven into the roof according to the mine's roof support plan, special bolt plates with a bracket capable of holding the rail 28 are used periodically as the mining face advances and the belt line 22 is extended to keep up with it, as would be well understood in the art. A mobile boot end 34 (FIG. 3) equipped with an on-board roof bolter 36 is preferably used to install the rail 28 ahead of the belt line 22. Obviously, each new segment of rail 28 must be added in good alignment with the rail already in place to ensure continuity and a smooth transition between segments. Thus, each module 26 of belt structure is able to ride forward or backward along the rail 28 in the entry 16 as necessary to allow the belt's tail piece 29 to keep up with the cutting face in advance or retreat mining, respectively.

Figure 2:
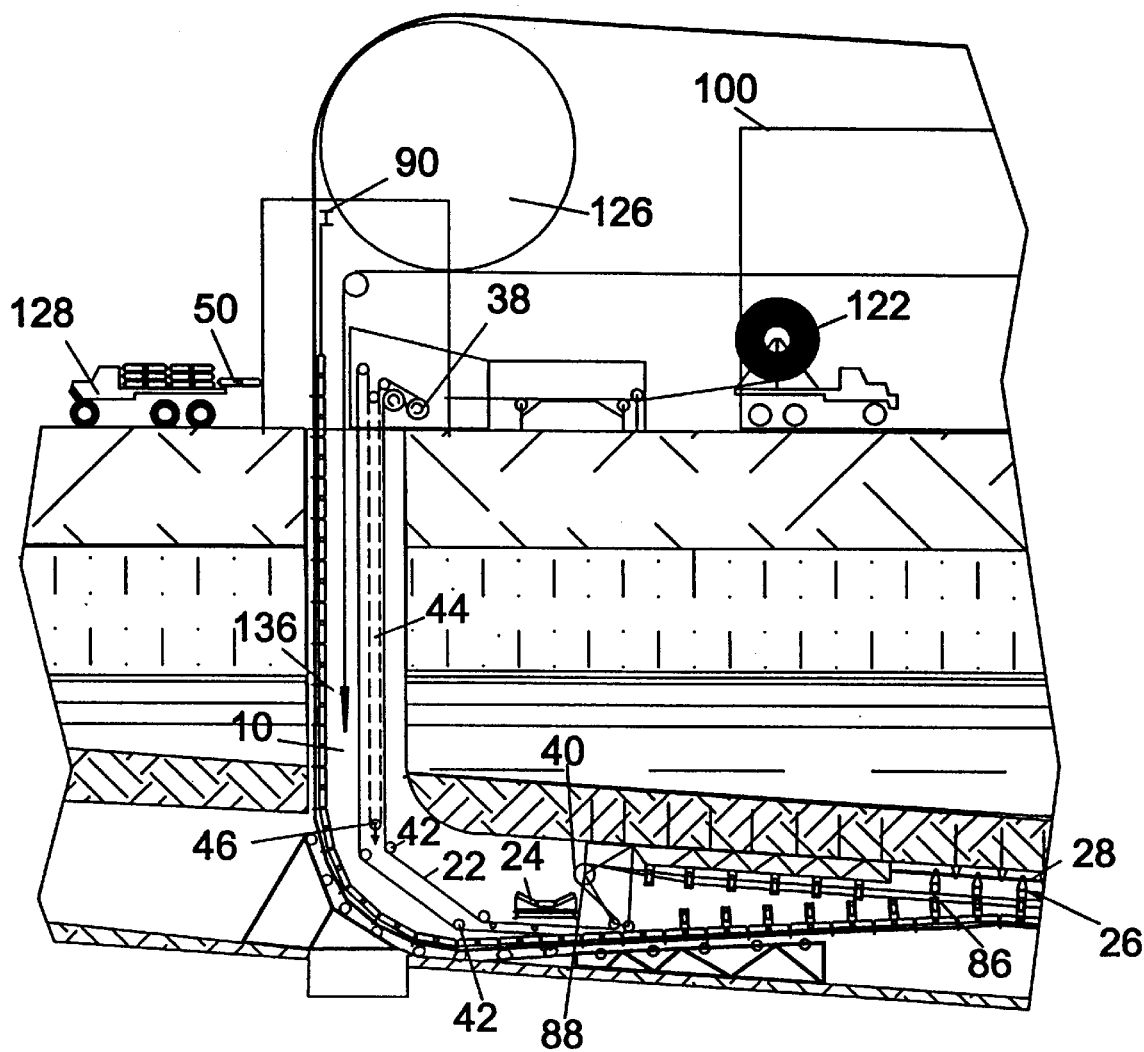
FIG. 2 is an enlarged view showing the shaft portion of the mine illustrated in FIG. 1.

As more clearly illustrated in FIG. 2, the belt line 22 is driven by a belt drive 38 preferably on top of the shaft 10 at the surface of the mine. This may be achieved by routing the belt 22 under the connecting belt 24 after the coal is discharged at the transfer point 40. Through a system of rollers 42, the tight top portion of the belt line 22 is pulled up the shaft 10 to the belt drive 38. Then, according to one aspect of the present invention, the slack portion of the belt 22 is looped through a vertical belt storage unit 44 housed within the shaft 10 of the mine. A portion of the belt line 22 is suspended in the shaft between two rollers at the surface and tensioned by a weight 46 sufficient to ensure proper tension in the return side of the belt. Thus, gravity and the vertical space provided by the shaft 10 are utilized to provide a belt take-up and storage unit that greatly exceeds the capacity and reliability of conventional horizontal units. The illustration in FIG. 2 shows a single belt loop and weight 46, but multiple loops could be used if necessary to further extend the storage capacity. Obviously, each loop would require a corresponding tensioning weight 46. As the belt line advances underground to keep up with the continuous miner 18, a corresponding portion of belt 22 is removed from the storage loops until it is completely used up. Only at that time it will become necessary to shut down the belt line and splice a new segment of belt in the line, and such operation is performed on the surface of the mine rather than underground. Therefore, the gravity storage unit of the invention provides a significant improvement over traditional belt advance techniques. Obviously, similar advantages exist when the belt line is shortened during retreat mining.

Figure 2A:
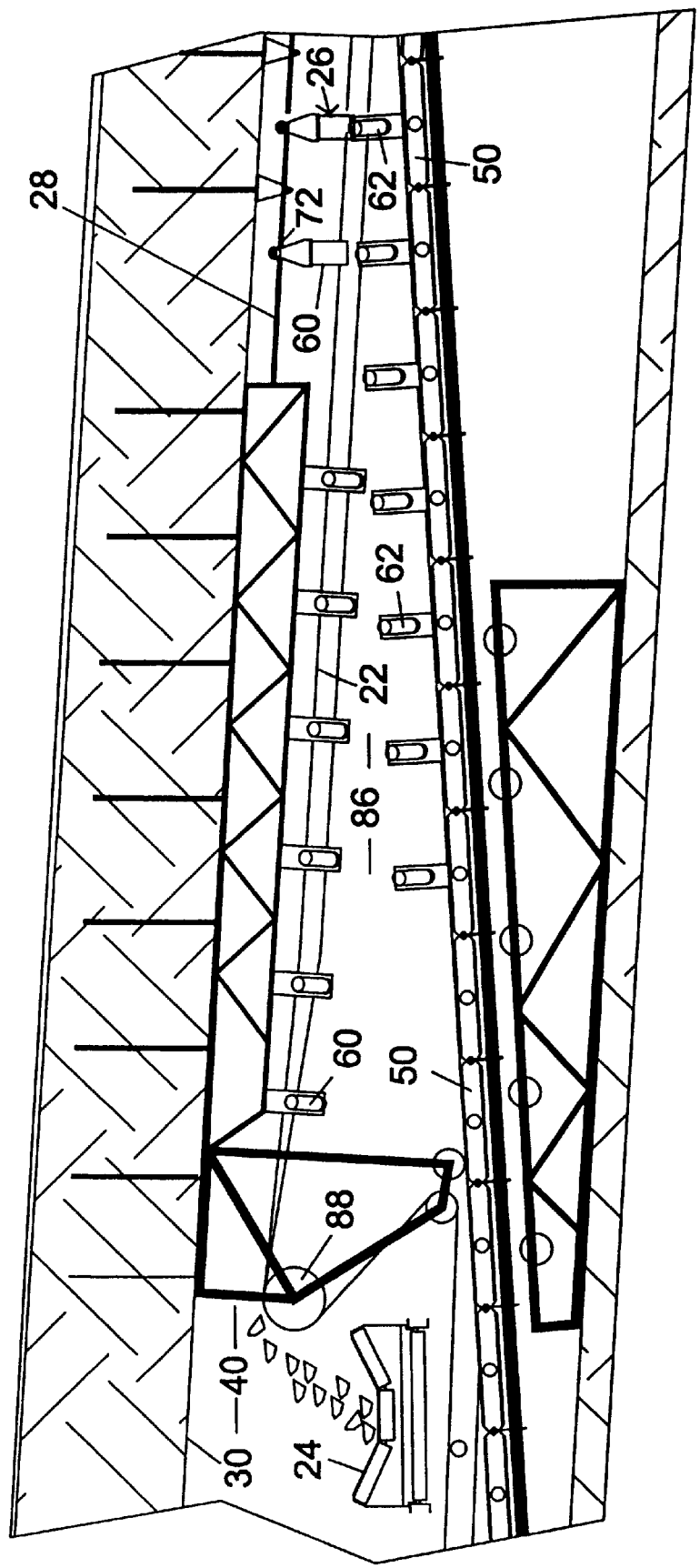
FIG. 2A is a further enlarged view of the transfer point of the underground belt showing the assembly of the structure of the invention.
Figure 5:
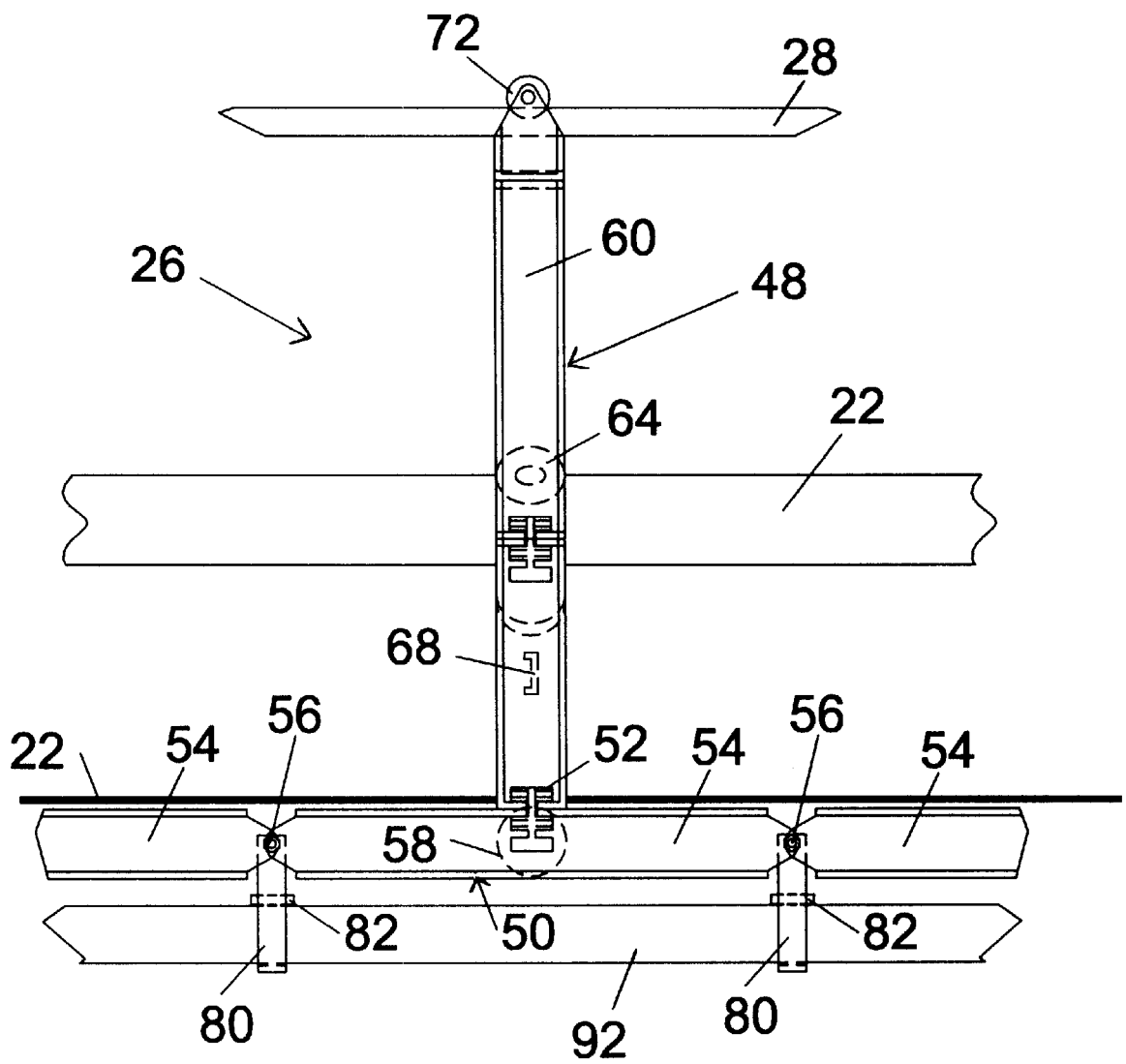
FIG. 5 is an elevational side view of the belt-structure module of FIG. 4.
Figure 6:
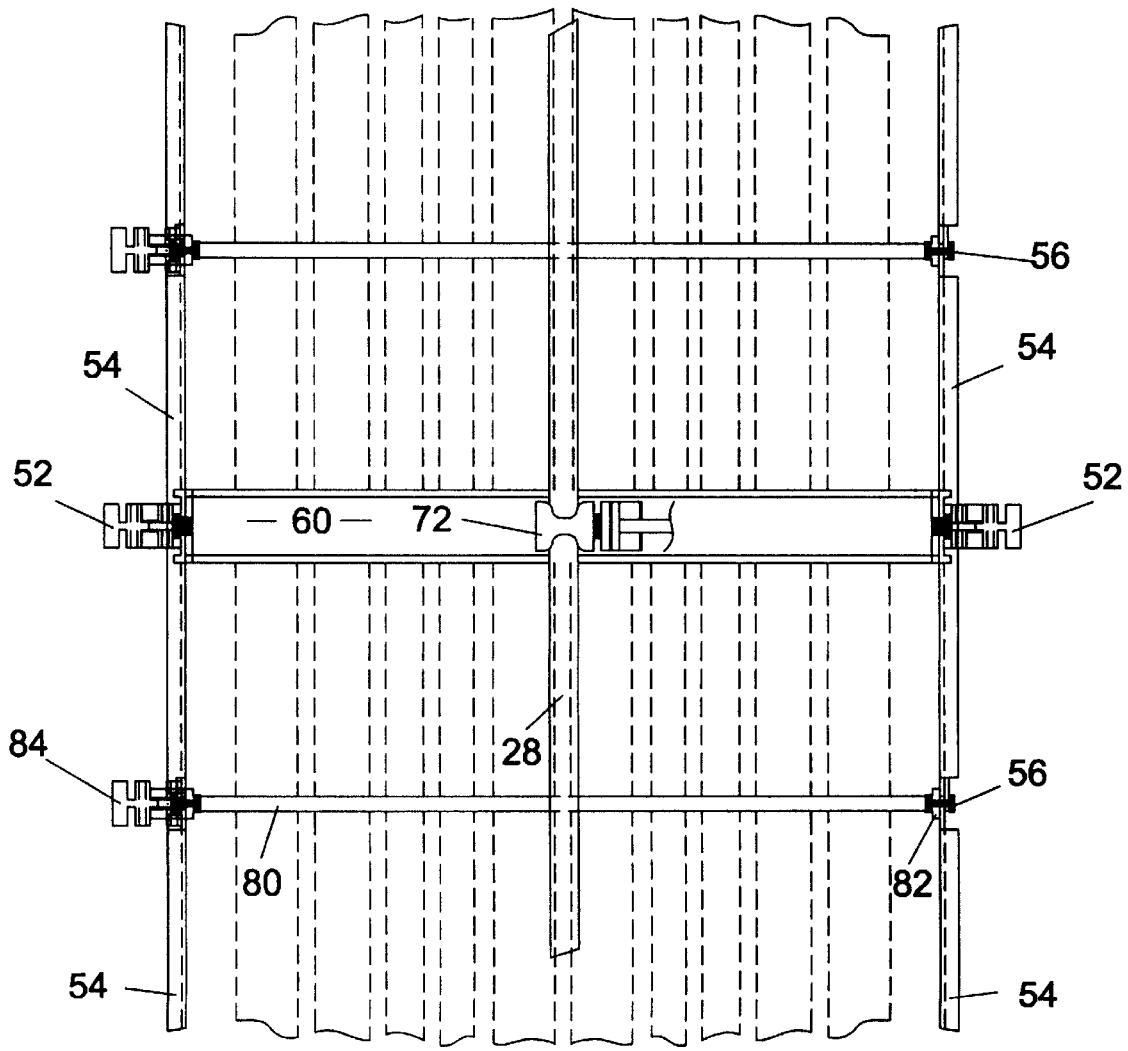
FIG. 6 is a top view of the belt-structure module of FIG. 4.

According to another aspect of the invention, assembly of the modular belt structure is completed underground at an assembly station near the transfer point 40, shown more particularly in FIG. 2A. Past the gravity storage unit 44, the slack side of the belt 22 is routed back underground through a system of rollers 42 and is fed into the train of structure modules 26 already in place just ahead of the transfer point 40. As seen in the front elevational view of FIG. 4, each module 26 consists of a top component 48 and a bottom component 50 connected by releasable clamps 52 provided on both sides of the module for quick and simple assembly. As illustrated in the side view of FIG. 5 and the top view of FIG. 6, the bottom components 50 of each module 26 includes longitudinal side members 54 pivotally attached at each end to the side members of adjacent modules through hinges 56 that impart flexibility to the chain of modules 26 that constitutes the movable infrastructure of the invention. The midpoints of each pair of longitudinal side members 54 are connected in H-shape fashion by a bottom idler roller 58 for supporting the slack side of the belt line 22. The top component 48 comprises a hanging bracket 60 releasably attached to a troughing idler frame 62 that includes multiple troughing idler rollers 64 (normally three) mounted on corresponding supporting axles 66. As in the case of all conveyor belts and as well understood in the art, the rollers 64 are positioned so as to form a trough to cause the top carrying side of the belt line 22 to assume a concave shape to prevent spillage during haulage. A cross beam 68 provides the structural support required for retaining the integrity of the troughing idler frame 62.

The hanging bracket 60 is preferably attached to the idler frame 62 by means of two releasable clamps 70 that make it possible to totally disconnect it from the rest of the belt-structure module 26. As detailed below, this feature simplifies the process of adding new modules to the movable train of belt structure underground. The bracket 60 is equipped with a pulley or roller wheel 72 (see FIG. 4) adapted for engagement with a rail 28 suspended from the roof R of the mine, such that the corresponding belt-structure module can tram forward or backward along the mine entry 16 as necessary to keep up with the mobile boot end 34. A tramming motor, winch or equivalent unit 74 is shown schematically in the drawings to indicate equipment that would necessarily be used to facilitate the motion of the train of modules 26 along the rail 28, well within the common expertise of underground mine operators. Similarly, the rail 28 is shown schematically in FIG. 4 supported by a roof bracket 76 attached to the mine's roof R by a roof bolt 78 used for roof support. The actual geometry of a roof bracket 76 suitable for practicing the invention could vary widely depending on roof conditions and equipment used for roof control, but its functional implementation would be well within the general knowledge of those skilled in the art.

According to another feature of the invention, in addition to the belt-supporting structure described above, the bottom component 50 of each module 26 also includes a bottom bracket 80 hingedly attached to one end of the side members 54 for supporting cables, hoses, pipes and other components of underground utility systems. As seen clearly in FIGS. 5 and 6, one side of the bottom bracket 80 is attached to an end of one of the side members 54 through a hinge 82, while the other side of the bottom bracket is attached to a corresponding end of the other side member 54 in the module by means of a releasable clamp 84.

Figure 7:
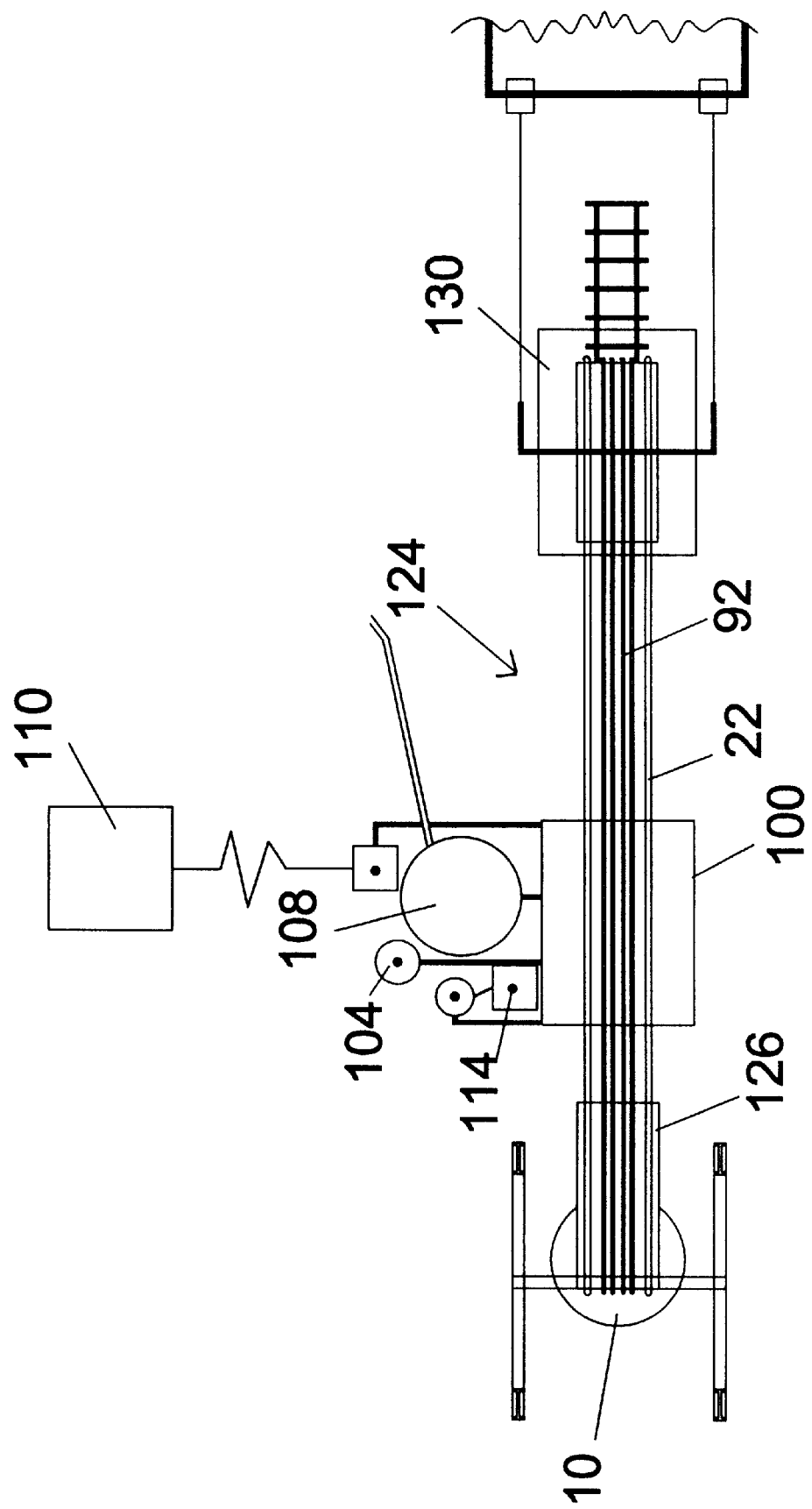
FIG. 7 is a top plan view of the surface facilities of a mine developed with the infrastructure system of the invention.

Within the surface-assisted continuous underground mining system of the invention, the bottom components 50 of the modules 26 are assembled and connected to one another at the surface of the shaft 10 and fed underground piece by piece on a continuous chain reaching an underground assembly station 86 located near the discharge end or head roller 88 of the belt line 22 (see FIG. 2). Because of their flexible connection, the chain of bottom components 50 is easily suspended from a retaining surface structure 90 and lowered by gravity and rolled toward the modules 26 already in service at the station 86. At the time of assembly of each bottom component 50 at the surface, all utility lines required by the mining operation are encased in the bottom bracket 80 and also fed underground, so that they can be provided continuously, without interruption, as the cutting face advances. The figures show a variety of cables, hoses and pipes for illustration only, denoted generally by the reference numeral 92 in FIG. 5, but the specific types of utility systems required would obviously depend on the equipment used in the operation, as would be clear to those skilled in the art. Each system would necessarily need to be supplied continuously from the surface. Accordingly, FIG. 7 illustrates a set up that could be used to implement this aspect of the invention.

Figure 4:
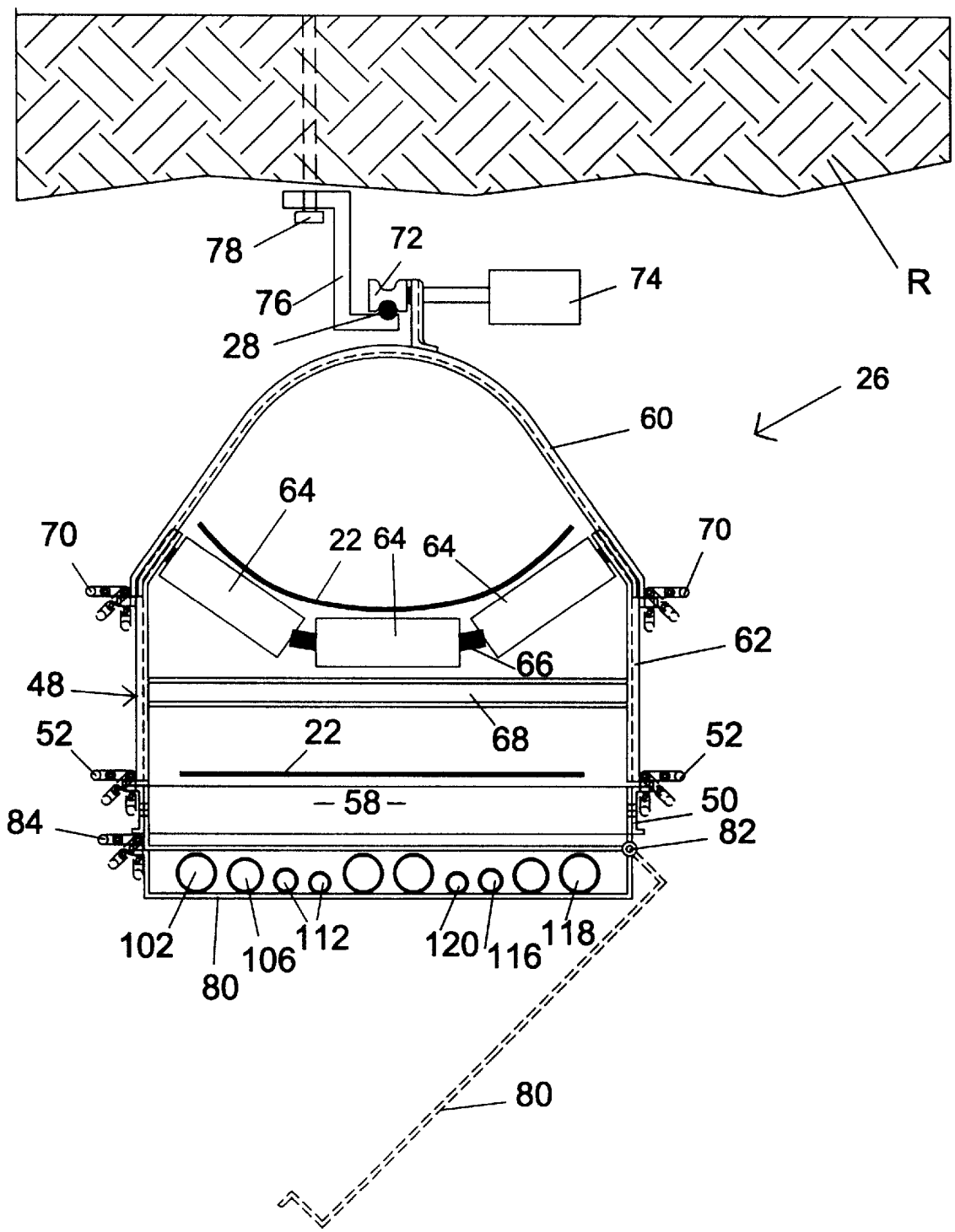
FIG. 4 is an elevational front view of a belt-structure module according to the invention.

It is noted that, in order to fully take advantage of the movable belt and utility infrastructure of the invention, all utility lines need to be lowered into or extracted from the shaft 10 concurrently and at the same rate as the mobile boot end moves forward or back from the cutting face 20. Therefore, a system must be devised that provides sufficient on-line storage of all excess utility lines while in operation. As illustrated in FIGS. 1 and 7, one such system comprises a central distribution and extension or reduction station 100 from where all utilities are provided through the cables and hoses reaching underground in the bottom component 50 of the infrastructure of the invention. For example, mine supply water is fed to a water supply pipe 102 from a supply water tank 104, and mine discharge water is returned to the surface in a return pipe 106 and stored in a tank 108 for periodic discharge. Electrical power, provided by a conventional substation 110, is delivered at different voltages through appropriate power cables 112, and hydraulic fluid is provided from a pumping station 114 in a pipe 116. Similarly, though their sources are not shown in the drawings, compressed air and telecommunication wires are provided through a suitable pipe 118 and cable 120, as well as other utilities that may be needed underground. All of these pipes and cables are combined with conveyor belt provided to the station 100 in spools 122 in sufficient length to meet the on-line storage requirements for continuous delivery to the mine. The on-line storage for the belt and the various cables and pipes, hereinafter collectively called "mining systems" for simplicity, is provided by a take-up structure 124 comprising two large drums around which the mining systems are looped between the distribution station 100 and mouth of the shaft 10. A rotatable drum is mounted a stationary unit 126 on top of the shaft 10 such that the mining systems can be lowered into the shaft in continuous fashion. As the mining systems advance underground and are correspondingly lowered in the shaft 10, additional units of the bottom component 50 delivered to the station 100, such as by trucks 128, are assembled around the belt and various pipes and cables, as seen in FIG. 4, and connected to each other to form a continuous, flexible train of bottom-component structure ready to be connected to units of the top component 48 underground. Behind the drum on the stationary unit 126, the mining systems are also looped around another rotatable drum on a mobile unit 130 mounted on a car 132 on rail tracks, such that its position can be varied to increase or decrease its distance from the stationary unit 126. Behind the mobile unit 130, a braking unit 134 is provided to block the movement of the mining systems from and to the station 100, where segments of belt, pipes and cables are added to or removed from the system as needed. Given the fixed position of the braking unit 134, the weight of the mining systems hanging in the shaft 10 from the drum unit 126 would tend to pull the car 132 supporting the mobile drum unit 130 toward the station 100. Therefore, a counterweight 136 is provided to pull the car 132 in the opposite direction through a cable/pulley unit 138.

From the configuration of the take-up unit 124, it is easy to see how it provides a storage for the mining systems equal to twice the distance between the nearest and farthest positions the car 132 can reach between the braking unit 134 and the cable/pulley unit 138. As the mining systems are lowered into the shaft 10, the position of the mobile drum unit 130 is adjusted proportionally to maintain the appropriate tension in the mining systems being fed to the mine. Obviously, when the mobile drum unit 130 approaches the station 100 no additional length of mining systems is available in storage. At that point, new segments of pipes, cables and belt are spliced or otherwise added to the mining systems and the mobile drum unit 130 is moved away to provide proportionate storage room.

Figure 3:
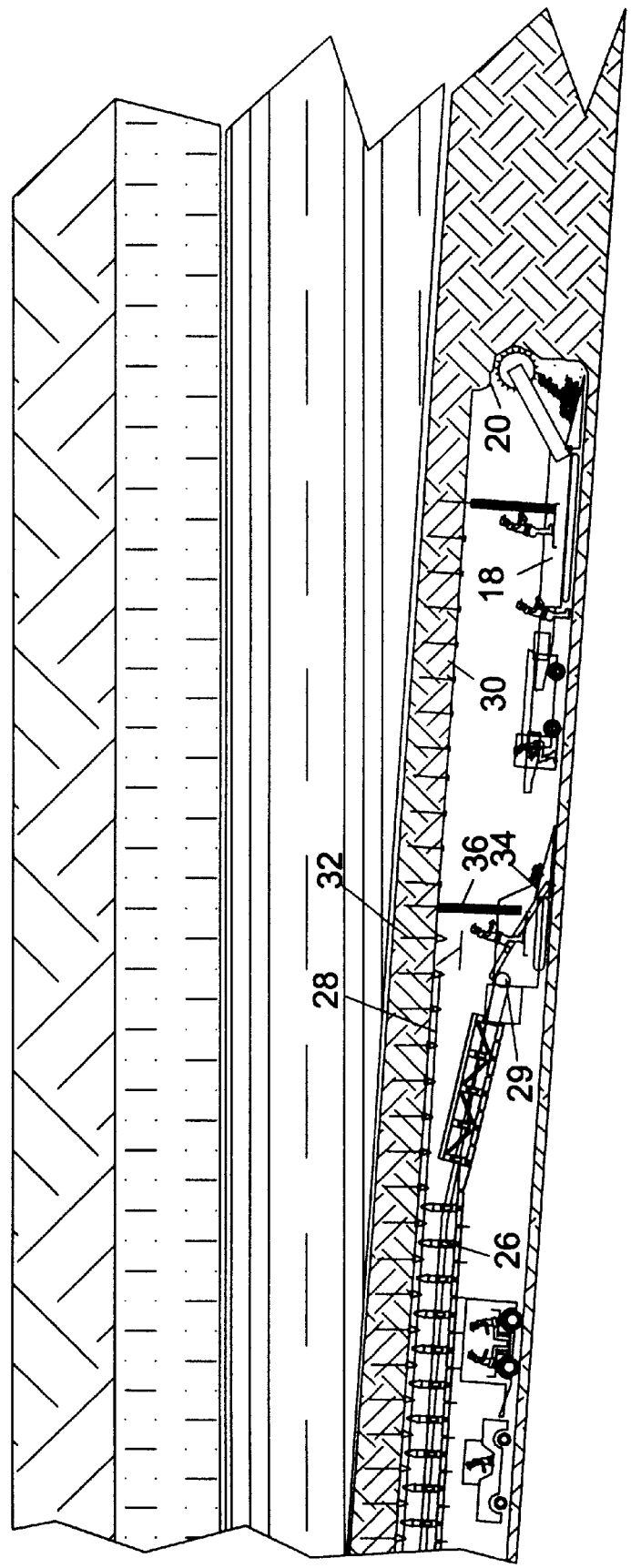
FIG. 3 is an enlarged view showing the mining face portion of the mine illustrated in FIG. 1.

During mine advance operations, the mobile boot end 34 seen in FIGS. 1 and 3 is moved forward to keep up with the continuous miner 18 cutting at the advancing face 20. Prior to each step forward, the roof bolter 36 is used to install new segments of rail 28 that enable the forward progress of the train of structure modules 26 that carry the belt and mining systems to the mobile boot end 34. As the train of structure modules advances with the aid of the tramming motors 74 (FIG. 4), the chain of bottom components 50 assembled at the surface also advances toward the mobile boot end 34 and is combined with a top component 48 of structure at the underground assembly station 86. In order to complete the assembly of each module 26 at station 86 (see FIG. 2A), the roller wheel 72 is hung from the rail 28 and at least one of the clamps 70 is opened to allow the insertion of the top side of the belt 22 between the hanging bracket 60 and the troughing idler frame 62 (see FIG. 4). Then the clamps 70 are secured in closed position and the top component 48 is attached to the first free bottom component 50 using clamps 52, thereby completing the addition of a new module 26 to the train of mine structure. Alternatively, as illustrated in FIG. 2A, a troughing idler frame 62 is first secured to each bottom component 50 reaching the assembly station 86 and then attached to a hanging bracket 60 that has already been hung on the rail 28, thereby producing a new structure module 26 that is ready to roll with the rest of the train already in operation.

The surface-assisted continuous underground mining method of the invention is fundamentally different from all conventional underground or surface mining systems, where belt structure and related mine support facilities are added or removed in segments at predetermined stages of mine advance or retreat, as applicable. The periodic shutdowns attendant to conventional practice cause significant loss of production time and corresponding inefficiencies. In the case of underground mining, the method of the invention also virtually eliminates the need for storage and mining-systems extension work underground, thereby greatly reducing underground haulage of materials and the attendant support equipment, organization and cost. As one skilled in the art would readily understand, these advantages constitute a substantial improvement over, and represent an exciting alternative to, the methods of advancing and retreating underground mining systems previously used in the art.

It is also noted that the system of the invention can be implemented with similar advantages in a mine developed through conventional in-seam entries, rather than through a vertical shaft. Except for the aspect of the vertical belt storage and take up unit, all other features of the invention can be implemented in equivalent fashion through horizontal or inclined entries to the mining face. Similarly, all aspects of the invention described in terms of advance mining, wherein belt, structure and mining utility systems are added to continuously keep up with the mining face, are also applicable to retreat mining, wherein the same systems are continuously removed in reverse fashion.

Various changes in the details, steps and components that have been described may be made by those skilled in the art within the principles and scope of the invention herein illustrated. For example, in addition to coal, it is clear that the concepts of the invention can be applied to any mining situation where a mineral deposit is embedded between strata at a depth suitable for mining by conventional underground continuous mining equipment, or in any situation where the cost of driving a shaft would be justified by the improvements in productivity afforded by the invention. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope embraced by any and all equivalent processes and products.

I claim:

1. In an underground mining operation where an ore reserve is mined with continuous mining equipment and conveyed on a belt conveyor reaching a proximity of a mining face, a system for moving a structure supporting the belt conveyor such that a loading end thereof can be advanced or retreated on a substantially continuous basis, said system comprising:

a continuous rail reaching said proximity of a mining face;

structure means for supporting said belt conveyor, the structure means being supported by and movable along the continuous rail and comprising a train of belt-structure modules hingedly connected to one another; and tramming means for moving the structure means along the continuous rail as required to maintain said loading end of the belt conveyor in said proximity of a mining face;

wherein each of said belt-structure modules comprises a top component and a bottom component releasably clamped to one another; the top component including a troughing idler frame with troughing rollers for supporting a tight side of the conveyor belt, the bottom component including bottom rollers for supporting a slack side of the conveyor belt; and each of said top and bottom components being self-contained, independently operable units.

2. The system of claim 1, wherein said mining operation includes a substantially vertical shaft from the surface to the ore reserve and said belt conveyor reaches said surface through the vertical shaft.

3. The system of claim 1, wherein said belt-structure modules are hingedly connected to one another through the bottom components.

4. In an underground mining operation where an ore reserve is mined with continuous mining equipment and conveyed on a belt conveyor reaching a proximity of a mining face, a system for moving a structure supporting the belt conveyor such that a loading end thereof can be advanced or retreated on a substantially continuous basis, said system comprising:

a continuous rail reaching said proximity of a mining face;

structure means for supporting said belt conveyor, the structure means being supported by and movable along the continuous rail; and tramming means for moving the structure means along the continuous rail as required to maintain said loading end of the belt conveyor in said proximity of a mining face;

wherein said mining operation includes a substantially vertical shaft from the surface to the ore reserve and said belt conveyor reaches said surface through the vertical shaft.

5. The system of claim 4, wherein said structure means for supporting said belt conveyor comprises a train of belt-structure modules hingedly connected to one another.

6. The system of claim 5, wherein each of said belt-structure modules comprises a top component and a bottom component releasably connected to one another; the top component including a troughing idler frame with troughing rollers for supporting a tight side of the conveyor belt, and the bottom component including bottom rollers for supporting a slack side of the conveyor belt.

7. The system of claim 6, wherein each of said belt-structure modules includes a hanging bracket with a roller wheel in rolling engagement with the continuous rail.

8. The system of claim 6, wherein said belt-structure modules are hingedly connected to one another through the bottom components.

9. The system of claim 8, wherein each of said belt-structure modules includes a hanging bracket with a roller wheel in rolling engagement with the continuous rail.

10. The system of claim 9, wherein said hanging bracket is releasably fastened to the troughing idler frame for assembly around a tight side of the conveyor belt.

11. The system of claim 8, wherein said bottom components are assembled and connected to one another at a surface location to form a continuous chain reaching a slack side of the conveyor belt at an underground location in a proximity of a discharge end thereof, where each of said bottom components is connected to a corresponding top component to form a new belt-structure module included in said train of belt-structure modules hingedly connected to one another.

12. The system of claim 11, further comprising a bottom bracket attached to said bottom component for supporting cables, hoses and pipes of underground utility systems.

13. The system of claim 12, wherein the system further comprises a gravity storage and take-up unit for the belt conveyor housed within the vertical shaft.

14. The system of claim 4, wherein said structure means for supporting the belt conveyor further comprises bracket means for supporting cables, hoses and pipes of underground utility systems.

15. The system of claim 4, wherein the system further comprises a gravity storage and take-up unit for the belt conveyor housed within the vertical shaft.

16. In an underground mining operation including a substantially vertical shaft from a surface location to an ore reserve and including a belt conveyor reaching the surface location through the vertical shaft, an improvement comprising:

a gravity storage and take-up unit for the belt conveyor housed within the vertical shaft.

17. In an underground mining operation where an ore reserve is mined with continuous mining equipment and conveyed to a surface location on a belt conveyor reaching a proximity of a mining face, a method for moving a structure supporting the belt conveyor such that a loading end thereof can be advanced or retreated on a substantially continuous basis to maintain a substantially constant distance from the mining face, said method comprising the following steps:

providing a continuous rail reaching said proximity of a mining face;

providing structure means for supporting said belt conveyor, the structure means being supported by and movable along the continuous rail; and tramming the structure means along the continuous rail as required to maintain said loading end of the belt conveyor in said proximity of a mining face;

wherein said mining operation includes a substantially vertical shaft from the surface to the ore reserve and said belt conveyor reaches said surface through the vertical shaft, the method further comprising the step of providing a gravity storage and take-up unit for the belt conveyor housed within the vertical shaft.

18. The method of claim 17, wherein said structure means for supporting the belt conveyor comprises a train of belt-structure modules; each of the belt-structure modules comprises a top component and a bottom component releasably connected to one another, the top component including a troughing idler frame with troughing idlers for supporting a tight side of the conveyor belt, and the bottom component including bottom idlers for supporting a slack side of the conveyor belt; and the bottom components are hingedly connected to one another.

19. The method of claim 18, further comprising the steps of:

assembling and connecting said bottom components to one another at said surface location to form a continuous chain reaching a slack side of the conveyor belt at an underground location in a proximity of a discharge end thereof; and connecting each of said bottom components to a corresponding top component to add a new belt-structure module to said train of belt-structure modules with bottom components hingedly connected to one another.

20. The method of claim 17, wherein said structure means for supporting the belt conveyor further comprises bracket means for supporting cables, hoses and pipes of underground utility systems.

21. The method of claim 20, wherein said mining operation includes a substantially vertical shaft from the surface to the ore reserve and said belt conveyor reaches said surface through the vertical shaft, the method further comprising the step of providing a gravity storage and take-up unit for the belt conveyor housed within the vertical shaft.

22. The method of claim 20, wherein said cables, hoses and pipes of underground utility systems are advanced on a substantially continuous basis from the surface of the mine.

* * * * *